United States Patent
Liu et al.

(10) Patent No.: US 11,362,547 B2
(45) Date of Patent: Jun. 14, 2022

(54) WIRELESS POWER SUPPLY APPARATUS

(71) Applicant: E Ink Holdings Inc., Hsinchu (TW)

(72) Inventors: Chuen-Jen Liu, Hsinchu (TW); Yi-Jhou Shen, Hsinchu (TW); Liang-Yu Yan, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/445,215

(22) Filed: Jun. 19, 2019

(65) Prior Publication Data

US 2020/0014250 A1    Jan. 9, 2020

(30) Foreign Application Priority Data

Jul. 9, 2018   (TW) .................................. 107123643

(51) Int. Cl.
| | | |
|---|---|---|
| *H01F 38/00* | (2006.01) | |
| *H02J 50/80* | (2016.01) | |
| *H04B 1/16* | (2006.01) | |
| *H04B 1/04* | (2006.01) | |
| *H02J 50/23* | (2016.01) | |

(52) U.S. Cl.
CPC .............. *H02J 50/80* (2016.02); *H02J 50/23* (2016.02); *H04B 1/04* (2013.01); *H04B 1/16* (2013.01)

(58) Field of Classification Search
CPC .. H02J 50/80; H02J 50/23; H04B 1/16; H04B 1/04
USPC ....................................................... 307/104
See application file for complete search history.

(56) References Cited

U.S. PATENT DOCUMENTS

| | | |
|---|---|---|
| 9,368,996 B2 | 6/2016 | Kim |
| 9,369,006 B2 | 6/2016 | Kwon et al. |
| 9,479,013 B2 | 10/2016 | Joye et al. |
| 9,602,955 B2 | 3/2017 | Cronie et al. |
| 9,806,767 B2 | 10/2017 | Walley et al. |
| 9,806,824 B2 | 10/2017 | Nakahara et al. |
| 2011/0127953 A1 | 6/2011 | Walley et al. |
| 2016/0197486 A1 | 7/2016 | Von Novak, III et al. |
| 2016/0308397 A1 | 10/2016 | Jung et al. |

(Continued)

FOREIGN PATENT DOCUMENTS

| | | |
|---|---|---|
| CN | 101345438 | 1/2009 |
| CN | 101645619 | 2/2010 |

(Continued)

OTHER PUBLICATIONS

"Office Action of Taiwan Counterpart Application," dated Nov. 12, 2019, p. 1-p. 4.

(Continued)

*Primary Examiner* — Daniel Kessie
*Assistant Examiner* — Dru Parries
(74) *Attorney, Agent, or Firm* — JCIPRNET

(57) ABSTRACT

A wireless power supply apparatus including a signal transmitting terminal and a signal receiving terminal is provided. The signal transmitting terminal encodes a digital data into a control signal and transmits a power supply signal in a manner of wireless communication according to the control signal. The signal receiving terminal receives the power supply signal from the signal transmitting terminal in the manner of wireless communication. The signal receiving terminal converts the power supply signal into a power source signal and a data signal and decodes the data signal into the digital data.

9 Claims, 5 Drawing Sheets

(56) References Cited

U.S. PATENT DOCUMENTS

2017/0195831 A1    7/2017  Cronie et al.
2017/0237292 A1*  8/2017  Jeong .................... H02J 50/80
                                                            307/104

FOREIGN PATENT DOCUMENTS

| | | |
|---|---|---|
| CN | 104811252 | 7/2015 |
| CN | 105122589 | 12/2015 |
| CN | 106374565 | 2/2017 |
| CN | 107615782 | 1/2018 |
| TW | 201042882 | 12/2010 |
| WO | 2016019159 | 2/2016 |

OTHER PUBLICATIONS

"Office Action of China Counterpart Application", dated Jan. 26, 2021, p. 1-p. 7.
"Office Action of China Counterpart Application", dated Sep. 16, 2021, p. 1-p. 7.

* cited by examiner

WIRELESS POWER SUPPLY APPARATUS

CROSS-REFERENCE TO RELATED APPLICATION

This application claims the priority benefit of Taiwan application serial no. 107123643, filed on Jul. 9, 2018. The entirety of the above-mentioned patent application is hereby incorporated by reference herein and made a part of this specification.

BACKGROUND OF THE INVENTION

1. Field of the Invention

The invention relates to a power supply apparatus, and more particularly, to a wireless power supply apparatus.

2. Description of Related Art

At present, due to the lack of a system architecture that can be easily and conveniently installed, the implementation of power supply and data transmission processing is complicated and cumbersome in the field of wireless charging and communication. For example, in a near-field communication (NFC) data transmission, it is required to install an NFC card reader at a transmitting terminal for data transmission. As for a receiving terminal, an NFC tag IC is required for data reception. Consequently, as their power sources also need to be additionally installed, the overall architecture becomes complicated and cumbersome.

SUMMARY OF THE INVENTION

The invention provides a wireless power supply apparatus with a simple architecture that has a wireless power supply and data transmission processing functions.

The wireless power supply apparatus of the invention includes a signal transmitting terminal and a signal receiving terminal. The signal transmitting terminal is configured to encode a first data into a control signal and transmit a power supply signal in a manner of wireless communication according to the control signal. The signal receiving terminal is configured to receive the power supply signal from the signal transmitting terminal in the manner of wireless communication. The signal receiving terminal converts the power supply signal into a power source signal and a data signal and decodes the data signal into a second data.

In an embodiment of the invention, the signal transmitting terminal includes a transmitting control circuit and a signal transmitting circuit. The transmitting control circuit is configured to receive the first data and encode the first data into the control signal. The signal transmitting circuit is coupled to the transmitting control circuit. The signal transmitting circuit is configured to transmit the power supply signal to the signal receiving terminal in the manner of wireless communication according to the control signal. The transmitting control circuit controls a signal transmitting operation of the signal transmitting circuit according to the control signal.

In an embodiment of the invention, the transmitting control circuit includes a first processor circuit. The first processor circuit is configured to receive the first data and encode the first data into the control signal. The first processor circuit is further configured to control a signal transmitting operation of the signal transmitting circuit according to the control signal.

In an embodiment of the invention, the signal transmitting circuit includes a wireless power supply circuit and a first antenna circuit. The wireless power supply circuit is coupled to the transmitting control circuit. The wireless power supply circuit is configured to transmit the power supply signal to the signal receiving terminal according to the control signal. The first antenna circuit is coupled to the wireless power supply circuit. The first antenna circuit is configured to transmit the power supply signal to the signal receiving terminal in the manner of wireless communication.

In an embodiment of the invention, the signal receiving terminal includes a signal receiving circuit and a receiving control circuit. The signal receiving circuit is configured to receive the power supply signal from the signal transmitting circuit in the manner of wireless communication and convert the power supply signal into the power source signal and the data signal. The receiving control circuit is coupled to the signal receiving circuit. The receiving control circuit is configured to receive the data signal and decode the data signal into the second data.

In an embodiment of the invention, the signal receiving circuit includes a second antenna circuit, a power converting circuit and a signal converting circuit. The second antenna circuit is configured to receive the power supply signal from the signal transmitting circuit in the manner of wireless communication. The power converting circuit is coupled to the second antenna circuit. The power converting circuit is configured to receive the power supply signal from the second antenna circuit and convert the power supply signal into the power source signal. The signal converting circuit is coupled to the second antenna circuit. The signal converting circuit is configured to receive the power supply signal from the second antenna circuit and convert the power supply signal into the data signal.

In an embodiment of the invention, the receiving control circuit includes a second processor circuit. The second processor circuit is coupled to the signal receiving circuit. The second processor circuit is configured to receive the data signal and decode the data signal into the second data.

Based on the above, according to the embodiments of the invention, the signal transmitting terminal encodes the first data into the control signal and transmits the power supply signal in the manner of wireless communication according to the control signal. As a result, the wireless power supply and data transmission processing functions may be implemented easily.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
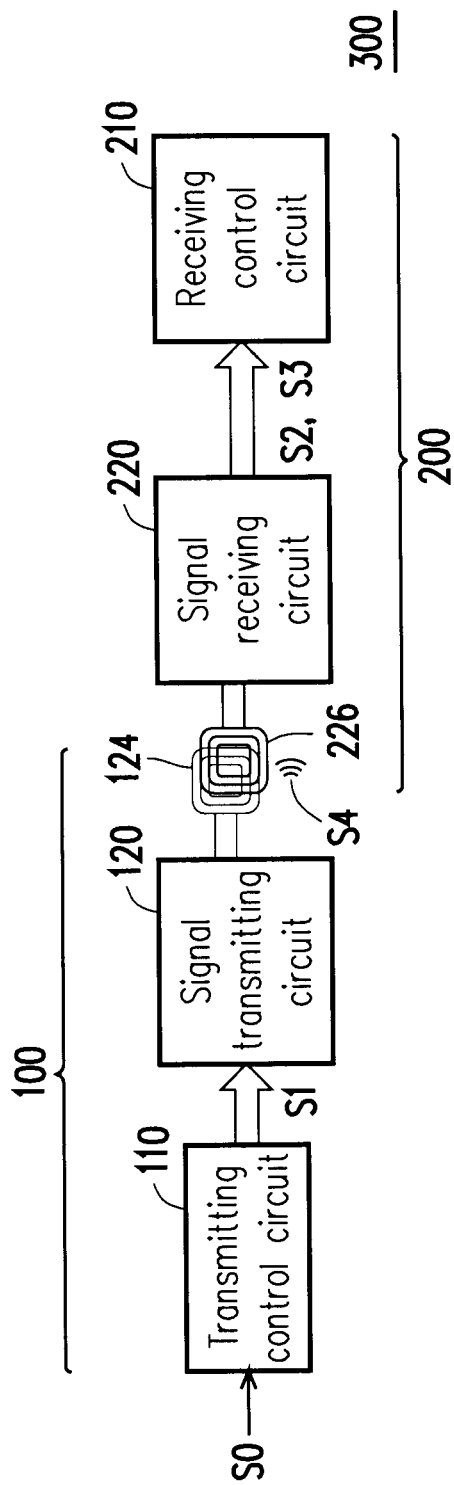
FIG. 1 is a schematic diagram illustrating a wireless power supply apparatus in an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
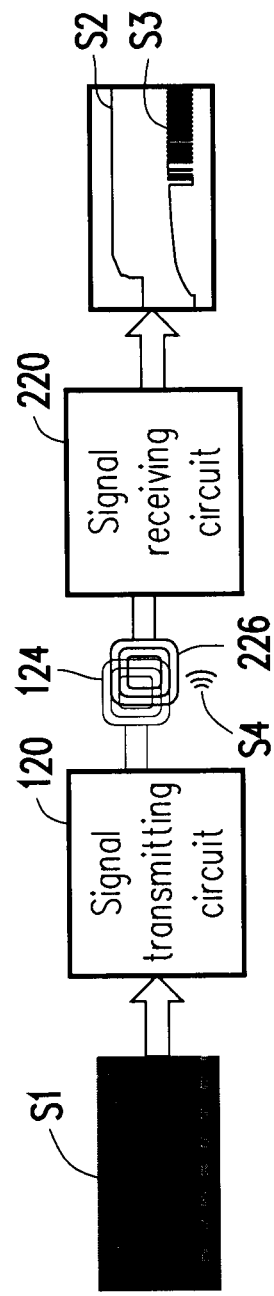
FIG. 2 is a schematic diagram illustrating waveforms of a control signal, a power source signal and a data signal in the embodiment of FIG. 1.

FIG. 1 is a schematic diagram illustrating a wireless power supply apparatus in an embodiment of the invention. FIG. 2 is a schematic diagram illustrating waveforms of a control signal, a power source signal and a data signal in the embodiment of FIG. 1. With reference to FIG. 1 and FIG. 2, a wireless power supply apparatus 300 includes a signal transmitting terminal 100 and a signal receiving terminal 200. The signal transmitting terminal 100 and the signal receiving terminal 200 perform a signal transferring operation through a first antenna circuit 124 and a second antenna circuit 226 in a manner of wireless communication.

In this embodiment, the signal transmitting terminal 100 includes a transmitting control circuit 110 and a signal transmitting circuit 120. The signal transmitting circuit 120 is coupled to the transmitting control circuit 110. The first antenna circuit 124 may be built into the signal transmitting circuit 120 or plugged-in from the outside of the signal transmitting circuit 120. The transmitting control circuit 110 receives a first data S0 and encodes the first data S0 into a control signal S1. The transmitting control circuit 110 controls a signal transmitting operation of the signal transmitting circuit 120 according to the control signal S1. The signal transmitting circuit 120 transmits a power supply signal S4 to a signal receiving circuit 220 in the manner of wireless communication through the first antenna circuit 124 according to the control signal S1. In this embodiment, the first data S0 is an encodable data, such as hexadecimal data, binary data or analog data. The control signal S1 may be in high level and low level.

In this embodiment, the signal receiving terminal 200 includes the signal receiving circuit 220 and a receiving control circuit 210. The receiving control circuit 210 is coupled to the signal receiving circuit 220. The signal receiving circuit 220 receives the power supply signal S4 from the signal transmitting circuit 120 in the manner of wireless communication through the second antenna circuit 226 and converts the power supply signal S4 into a power source signal S2 and a data signal S3. The second antenna circuit 226 may be built-in inside the signal receiving circuit 220 or may be plugged-in outside the signal receiving circuit 220.

In this embodiment, the wireless power supply and data transmission processing functions may be implemented easily by the wireless power supply apparatus 300 which includes four functional modules (the transmitting control circuit 110, the signal transmitting circuit 120, the signal receiving circuit 220 and the receiving control circuit 210) together with specific working principles and actions, so as to simplify complicated power supply architecture and cumbersome data transmission.

Figure 3:
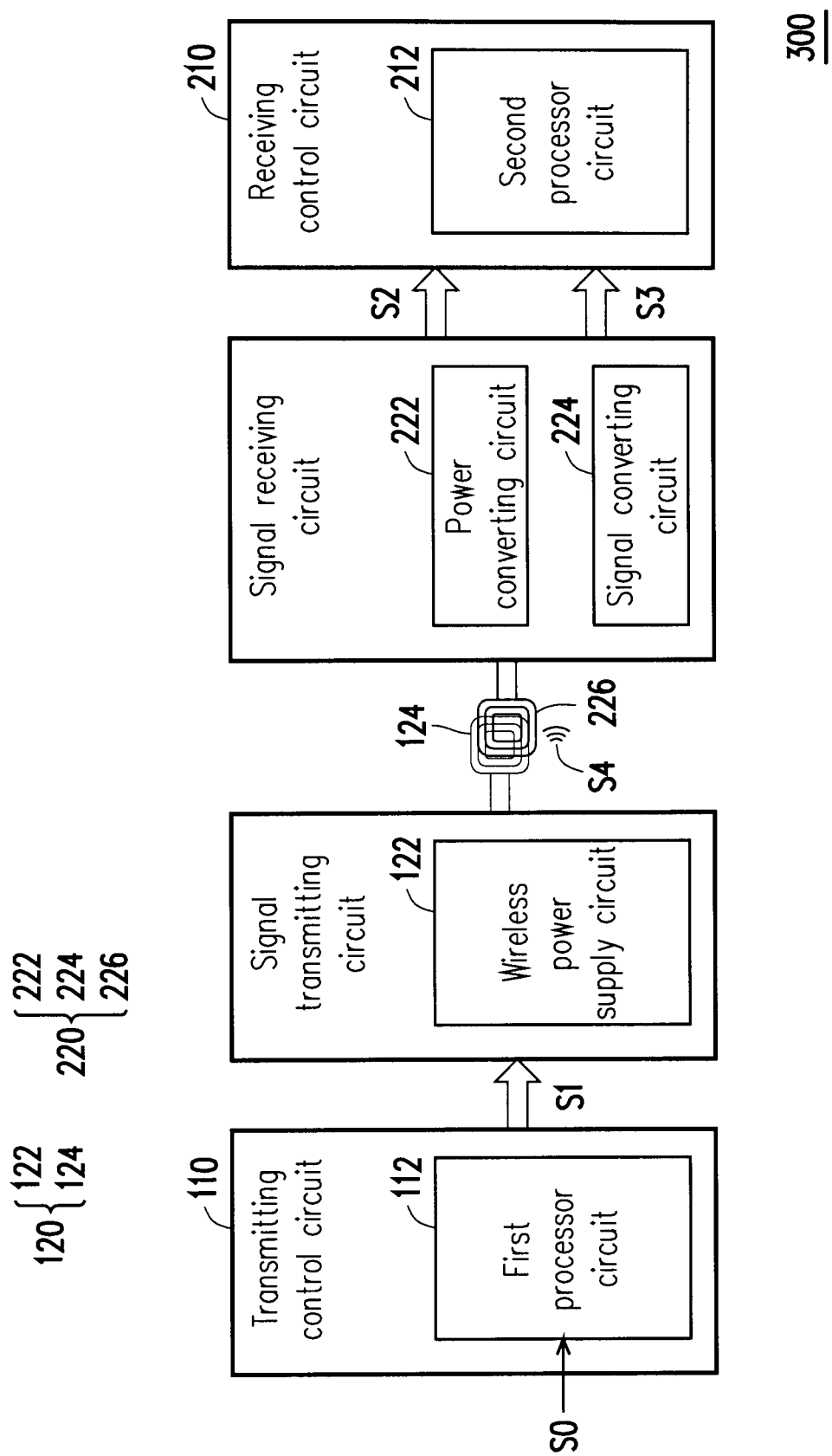
FIG. 3 is a schematic diagram illustrating the wireless power supply apparatus in another embodiment of the invention.

FIG. 3 is a schematic diagram illustrating the wireless power supply apparatus in another embodiment of the invention. With reference to FIG. 3, in this embodiment, the transmitting control circuit 110 includes a first processor circuit 112. The signal transmitting circuit 120 includes a wireless power supply circuit 122 and the first antenna circuit 124. The first antenna circuit 124 is coupled to the wireless power supply circuit 122. The first processor circuit 112 receives the first data S0. The first processor circuit 112 encodes the first data S0 into the control signal S1. The first processor circuit 112 controls a signal transmitting operation of the wireless power supply circuit 122 according to the control signal S1. In this embodiment, the first processor circuit 112 includes an encoder function for converting the first data S0 into the control signal S1 as well as a controller function for performing a corresponding control operation according to an encoding result. In this embodiment, the wireless power supply circuit 122 transmits the power supply signal S4 to the signal receiving circuit 220 in the manner of wireless communication through the first antenna circuit 124 according to the control signal S1.

In this embodiment, the first processor circuit 112 encodes the first data S0 into the control signal S1. For instance, the first data S0 with bit "0" is encoded into the control signal S1 in low level, and the first data S0 with bit "1" is encoded into the control signal S1 in high level. Accordingly, the control signal S1 may be in high level or low level, and may be configured to control a power supply operation of the wireless power supply circuit 122. This power supply operation includes Charging ON and Charging OFF. Thus, a power supply of the wireless power supply circuit 122 behaves similar to how a digital signal (H/L) is changed and transmitted.

In this embodiment, the signal receiving circuit 220 includes the second antenna circuit 226, a power converting circuit 222 and a signal converting circuit 224. The power converting circuit 222 and the signal converting circuit 224 are coupled to the second antenna circuit 226. The signal receiving circuit 220 receives the power supply signal S4 from the signal transmitting circuit 120 in the manner of wireless communication through the second antenna circuit 226. The power converting circuit 222 receives the power supply signal S4 from the second antenna circuit 226 and converts the power supply signal S4 into the power source signal S2. The signal converting circuit 224 receives the power supply signal S4 from the second antenna circuit 226 and converts the power supply signal S4 into the data signal S3. In this embodiment, the receiving control circuit 210 includes a second processor circuit 212. The second processor circuit 212 is coupled to the signal receiving circuit 220. The second processor circuit 212 receives the data signal S3, and decodes the data signal S3 into a second data. The second data is an interpretable data, which may be, for example, the first data S0.

Figure 4:
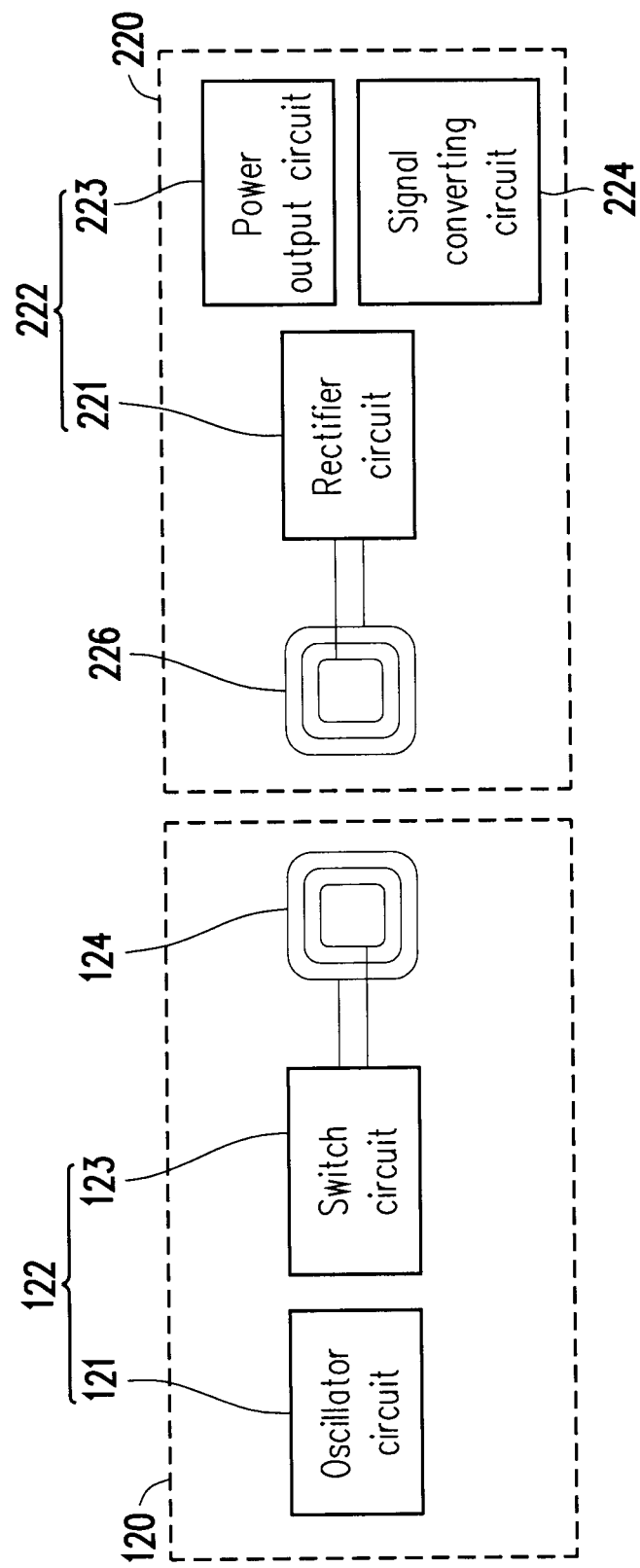
FIG. 4 is a schematic diagram illustrating a signal transmitting circuit and a signal receiving circuit in an embodiment of the invention.
Figure 5:
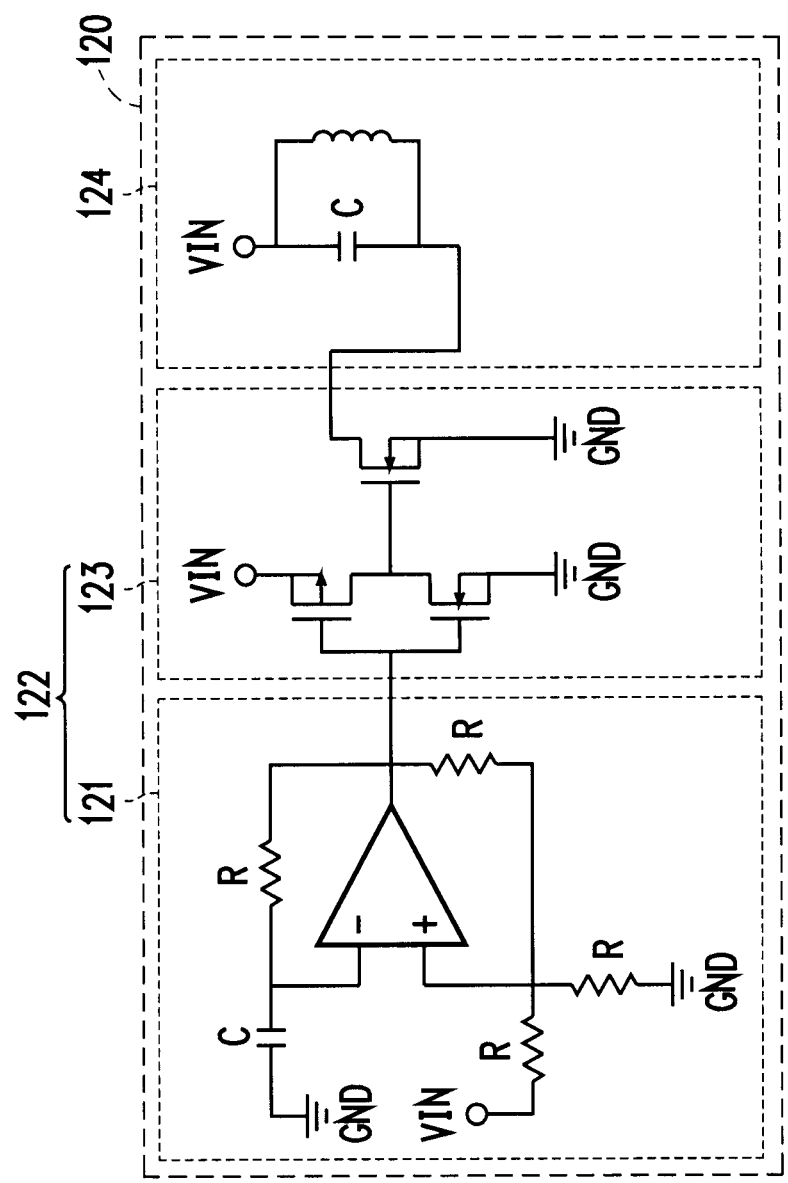
FIG. 5 is a schematic circuit diagram of the signal transmitting circuit in the embodiment of FIG. 4.
Figure 6:
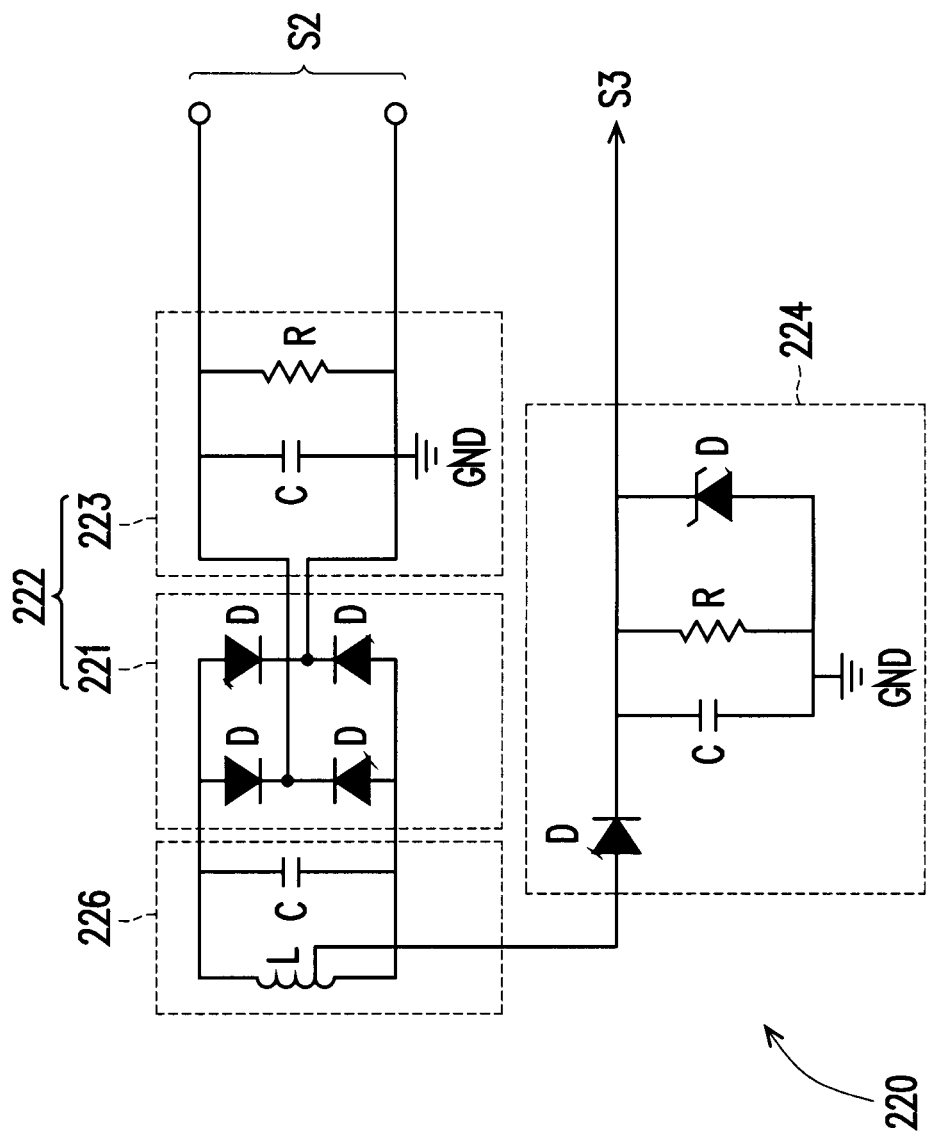
FIG. 6 is a schematic circuit diagram of the signal receiving circuit in the embodiment of FIG. 4.

FIG. 4 is a schematic diagram illustrating a signal transmitting circuit and a signal receiving circuit in an embodiment of the invention. FIG. 5 is a schematic circuit diagram of the signal transmitting circuit in the embodiment of FIG. 4. FIG. 6 is a schematic circuit diagram of the signal receiving circuit in the embodiment of FIG. 4. With reference to FIG. 4 to FIG. 6, in this embodiment, the signal transmitting circuit 120 includes an oscillator circuit 121, a switch circuit 123 and the first antenna circuit 124. The control signal S1 may correspond to an input signal VIN in FIG. 5. The oscillator circuit 121 and the switch circuit 123 serve as the wireless power supply circuit 122. In this embodiment, the signal receiving circuit 220 includes a rectifier circuit 221, a power output circuit 223, the signal converting circuit 224 and the second antenna circuit 226.

The rectifier circuit 221 and the power output circuit 223 serve as the power converting circuit 222. The power converting circuit 222 outputs the power source signal S2 to the next stage circuit. The signal converting circuit 224 outputs the data signal S3 to the second processor circuit 212. Further, in this embodiment, enough teaching, suggestion, and implementation regarding detailed operation of each circuitry block may be obtained with reference to common knowledge in the related art.

In summary, according to the embodiments of the invention, the signal transmitting terminal encodes the first data into the control signal and transmits the power supply signal in the manner of wireless communication according to the control signal. The signal transmitting circuit has a simple architecture including the oscillator circuit, the switch circuit and the first antenna circuit, and the signal receiving circuit has a simple architecture including the rectifier circuit, the power output circuit, the signal converting circuit and the second antenna circuit. As a result, the wireless power supply apparatus can easily implement the wireless power supply and data transmission processing functions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless power supply apparatus, comprising:
   a signal transmitting terminal, configured to encode a first data into a control signal and transmit a power supply signal in a manner of wireless communication according to the control signal, wherein the signal transmitting terminal transmits the power supply signal by an oscillator circuit, a first antenna circuit, and a switch circuit; and
   a signal receiving terminal, receiving the power supply signal from the signal transmitting terminal in the manner of wireless communication, and converting the power supply signal into a power source signal for charging an electronic device and a data signal,
   wherein the signal transmitting terminal comprises:
   a transmitting control circuit, configured to receive the first data and encode the first data into the control signal; and
   a wireless power supply circuit, coupled to the transmitting control circuit, and configured to transmit the power supply signal to the signal receiving terminal according to the control signal, wherein the power supply circuit is controlled by the control signal to be operated in a charging on state or a charging off state in order to transmit the first data from the signal transmitting terminal to the signal receiving terminal,
   wherein the oscillator circuit comprises:
   an amplifier, having a first input terminal, a second input terminal and an output terminal;
   a capacitor, having a first terminal receiving a reference voltage and a second terminal coupled to the first input terminal of the amplifier;
   a first resistor, coupled between the first input terminal and the output terminal of the amplifier;
   a second resistor, having a first terminal receiving the control signal and a second terminal coupled to the second input terminal of the amplifier;
   a third resistor, having a first terminal coupled to the second input terminal of the amplifier and a second terminal receiving the reference voltage; and
   a fourth resistor, coupled between the second input terminal and the output terminal of the amplifier,
   wherein the switch circuit comprises:
   a first transistor, having a drain terminal, a source receiving the control signal and a gate terminal coupled to the output terminal of the amplifier;
   a second transistor, having a drain terminal coupled to the drain terminal of the first transistor, a source terminal receiving the reference voltage and a gate terminal coupled to the output terminal of the amplifier; and
   a third transistor having a drain terminal coupled to the first antenna circuit, a source terminal receiving the reference voltage, and a gate terminal coupled to the drain terminals of the first transistor and the second transistor.

2. The wireless power supply apparatus according to claim 1, wherein the signal receiving terminal decodes the data signal into a second data.

3. The wireless power supply apparatus according to claim 2, wherein the signal transmitting terminal comprises:
   a signal transmitting circuit, coupled to the transmitting control circuit, and configured to transmit the power supply signal to the signal receiving terminal in the manner of wireless communication according to the control signal.

4. The wireless power supply apparatus according to claim 3, wherein the transmitting control circuit comprises:
   a first processor circuit, configured to receive the first data and encode the first data into the control signal.

5. The wireless power supply apparatus according to claim 3, wherein the signal transmitting circuit comprises:
   the wireless power supply circuit; and
   the first antenna circuit, coupled to the wireless power supply circuit, and configured to transmit the power supply signal to the signal receiving terminal in the manner of wireless communication.

6. The wireless power supply apparatus according to claim 3, wherein the signal receiving terminal comprises:
   a signal receiving circuit, configured to receive the power supply signal from the signal transmitting circuit in the manner of wireless communication and convert the power supply signal into the power source signal and the data signal; and
   a receiving control circuit, coupled to the signal receiving circuit, and configured to receive the data signal and decode the data signal into the second data.

7. The wireless power supply apparatus according to claim 6, wherein the signal receiving circuit comprises:
   a second antenna circuit, receiving the power supply signal from the signal transmitting circuit in the manner of wireless communication;
   a power converting circuit, coupled to the second antenna circuit, and configured to receive the power supply signal from the second antenna circuit and convert the power supply signal into the power source signal; and
   a signal converting circuit, coupled to the second antenna circuit, and configured to receive the power supply signal from the second antenna circuit and convert the power supply signal into the data signal.

8. The wireless power supply apparatus according to claim 6, wherein the receiving control circuit comprises:
   a second processor circuit, coupled to the signal receiving circuit, and configured to receive the data signal and decode the data signal into the second data.

9. The wireless power supply apparatus according to claim 2, wherein the second data is identical to the first data.

\* \* \* \* \*